US008856306B2

(12) United States Patent
Myrah et al.

(10) Patent No.: US 8,856,306 B2
(45) Date of Patent: Oct. 7, 2014

(54) DETERMINING AN ACTIVE ZONE MANAGER BASED ON DISRUPTION PREDICTION METRICS

(75) Inventors: Michael G Myrah, Redmond, WA (US); Balaji Natrajan, Spring, TX (US); Sohail Hameed, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 13/595,693

(22) Filed: Aug. 27, 2012

(65) Prior Publication Data

US 2014/0058997 A1 Feb. 27, 2014

(51) Int. Cl.
*G06F 15/173* (2006.01)

(52) U.S. Cl.
USPC .......................... 709/223; 709/220; 709/200

(58) Field of Classification Search
CPC .......................... H04L 12/5696; A01B 12/006
USPC .................................. 709/200, 220, 223, 226
See application file for complete search history.

(56) References Cited

U.S. PATENT DOCUMENTS

| 8,051,436 | B2 | 11/2011 | Jones |
| 2006/0034309 | A1 | 2/2006 | Saklecha et al. |
| 2012/0030321 | A1 | 2/2012 | Stimac |

FOREIGN PATENT DOCUMENTS

TW 200805073 1/2008

OTHER PUBLICATIONS

Brocade Communication Systems, Inc., "Brocade Advanced Zoning: User's Guide Version 3.1.0/4.1.0," 2003, retrieved from: <https://lbtwiki.cern.ch/pub/Online/AdminZoningFCSwitch/BrocadeAdminDoc.pdf>.

Brocade Communication Systems, Inc., "Brocade(R) Zoning: User's Guide," Version 2.6, 2001, retrieved from: <http://www.filibeto.org/sun/lib/nonsun/brocade/manuals/2.6/53_0000202_02.pdf>.

Brocade Communication Systems, Inc., "Fabric OS Troubleshooting and Diagnostics Guide," Jul. 28, 2009, retrieved from: <http://support.dell.com/support/edocs/NETWORK/PC_BSer/B-8000/B_FOSTSG.pdf>.

Cisco Systems, Inc., "Configuring and Managing Zones," Cisco Mobile Devices 9000 Family Fabric Manager Configuration Guide, Jun. 2008, pp. 30-1 to 30-46, Chapter 30, Cisco Systems, Inc., San Jose, CA, retrieved from: <http://www.cisco.com/en/US/docs/storage/san_switches/mds9000/sw/rel_3_x/configuration/guides/fm_3_4_x/fm.pdf>.

Cisco Systems, Inc., "Configuring Inter-VSAN Routing," Cisco Mobile Devices 9000 Family Fabric Manager Configuration Guide, Jun. 2008, pp. 29-1 to 29-34, Chapter 29, Cisco Systems, Inc., San Jose, CA, retrieved from: <http://www.cisco.com/en/US/docs/storage/san_switches/mds9000/sw/rel_3_x/configuration/guides/fm_3_4_x/fm.pdf>.

Cisco Systems, Inc., "Using the CFS infrastructure" Cisco Mobile Devices 9000 Family Fabric Manager Configuration Guide, Jun. 2008, pp. 13-1 to 13-20, Chapter 13, Cisco Systems, Inc., San Jose, CA, retrieved from: <http://www.cisco.com/en/US/docs/storage/san_switches/mds9000/sw/rel_3_x/configuration/guides/fm_3_4_x/fm.pdf>.

Harry Mason, "Serial Attached SCSI Establishes its Position in the Enterprise," Sep. 11, 2008, retrieved from: <http://www.scsita.org/sas_library/case%20studies/6GbpsSAS.pdf>.

Hewlett-Packard Development Company, L.P., "HP 3G Virtual SAS Manager User Guide," 3rd Edition, Feb. 2011, Hewlett-Packard Development Company, L.P., retrieved from: <http://bizsupport2.austin.hp.com/bc/docs/support/SupportManual/c01956986/c01956986.pdf>.

(Continued)

*Primary Examiner* — El Hadji Sall
(74) *Attorney, Agent, or Firm* — Mark Justin Kupets

(57) ABSTRACT

Examples disclosed herein relate to determining an active zone manager based on disruption prediction metrics. Examples include providing a first disruption prediction metric of a first fabric to a second fabric, acquiring a second disruption prediction metric from a second fabric, and determining the active zone manager based on the first and second disruption prediction metrics.

15 Claims, 7 Drawing Sheets

(56) References Cited

OTHER PUBLICATIONS

Hewlett-Packard Development Company, L.P., "Serial Attached SCSI storage technology," 2nd Edition, Jun. 2009, Hewlett-Packard Development Company, L.P.

International Committee for Information Technology Standards (INCITS), "American National Standard for Information Technology—SAS Protocol Layer (SPL)," American National Standard, Jun. 28, 2011, INCTIS 476-2011, American National Standards Institute, Inc., New York, NY.

McDATA Corporation, "McDATA 4416 Fibre Channel Switch Module Installation Guide," Jan. 2006, retrieved from: <http://support.dell.com/support/edocs/NETWORK/McData4416/4416_SIG.pdf>.

McDATA Corporation, "McDATA Switch Module Management Guide," Jan. 2006, retrieved from: <http://support.dell.com/support/edocs/NETWORK/McData4416/4416SMMG.pdf>.

QLogic Corporation, "QLogic Fibre Channel Switch: Event Message Guide, Firmware Version 7.4," Apr. 2008, retrieved from: <http://filedownloads.qlogic.com/files/manual/67944/Message_Guide_v74_59060-05_[A].pdf>.

PERMISSION TABLE 280A

|    | 11 | 12 | 13 |
|----|----|----|----|
| 11 |    | P  |    |
| 12 |    |    | P  |
| 13 |    |    |    |

PERMISSION TABLE 280B

|    | 12 | 13 | 14 |
|----|----|----|----|
| 12 |    |    | P  |
| 13 |    |    | P  |
| 14 |    |    |    |

*FIG. 2C*

UPDATED PERMISSION TABLE 280C

|    | 11 | 12 | 13 | 14 | 15 | 16 |
|----|----|----|----|----|----|----|
| 11 |    | P  |    |    |    |    |
| 12 |    |    | P  |    |    |    |
| 13 |    |    |    | P  |    |    |
| 14 |    |    |    |    | P  | P  |
| 15 |    |    |    |    |    | P  |
| 16 |    |    |    |    |    |    |

*FIG. 2D*

DETERMINING AN ACTIVE ZONE MANAGER BASED ON DISRUPTION PREDICTION METRICS

BACKGROUND

In computing systems, a storage network may include a fabric in which a storage controller communicates with a plurality of storage devices to store and retrieve information. Some or all of the storage devices may be remote from a computing device including the storage controller and may be connected to the storage controller via a plurality of routing modules. A routing module may be provided, for example, in a storage enclosure containing a collection of the storage devices, in a networking device separate from such a storage enclosure, or in the computing device containing the storage controller.

BRIEF DESCRIPTION OF THE DRAWINGS

The following detailed description references the drawings, wherein:

FIG. 2C is a diagram of example permission tables for the fabrics of FIG. 2A;

FIG. 2D is a diagram of an example updated permission table of one of the fabrics of FIGS. 2A-2B after resolution of zone group identifier conflicts;

DETAILED DESCRIPTION

Figure 1:
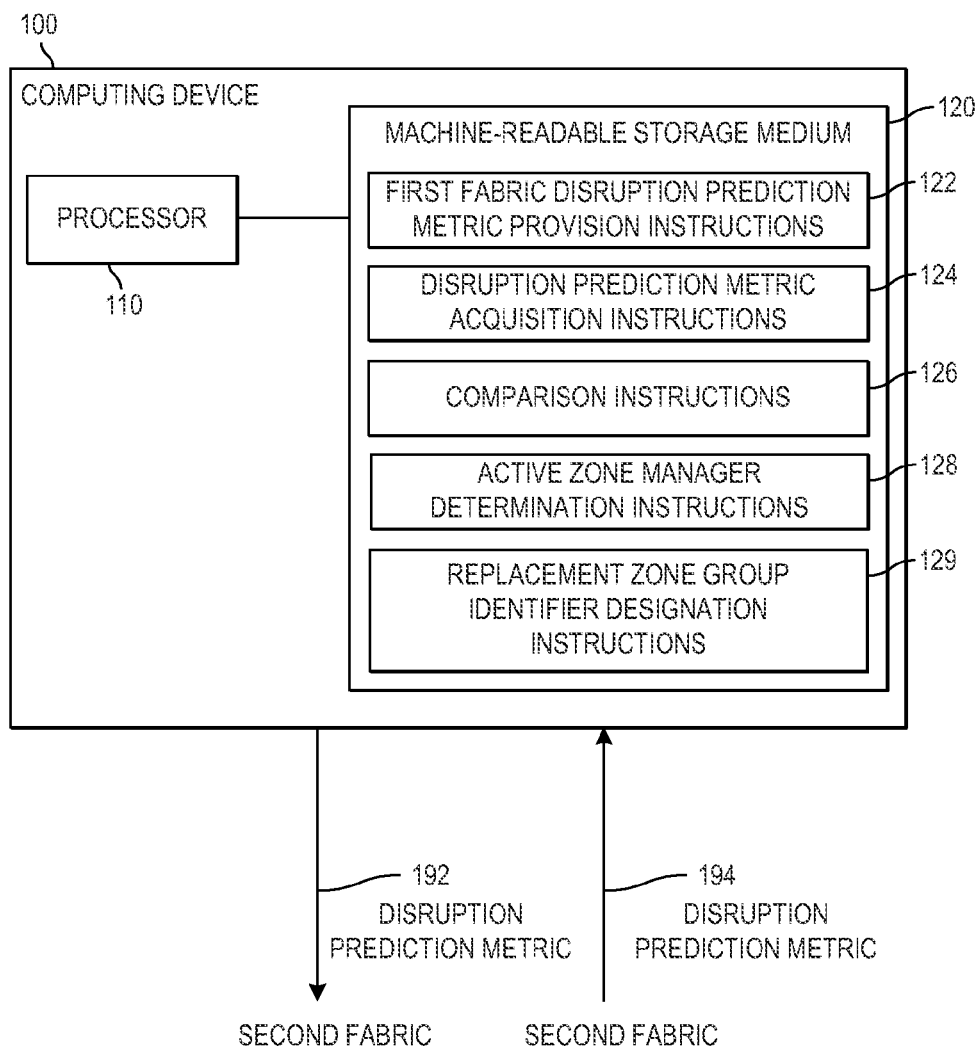
FIG. 1 is a block diagram of an example computing device to determine an active zone manager based on disruption prediction metrics.

As noted above, a fabric may include a storage controller connected to storage devices via routing modules. As used herein, a "fabric" is an information storage system that includes at least one storage controller and a plurality of storage devices connected to receive input/output (I/O) communications from at least one of the storage controllers either directly or via at least one routing module. In some examples, a fabric may define zone groups to implement access controls among components of the fabric, such as the storage controllers and storage devices. In such examples, each zone group of the fabric may have a different zone group identifier (e.g., name, number, etc.) assigned to it and the fabric may be associated with a zone manager to manage zoning in the fabric.

In some situations, it may be desirable to stack, trunk, or otherwise connect together two separate fabrics. For example, two fabrics may be stacked to give storage controllers (e.g., initiators) in one fabric access to additional storage devices in the other fabric. However, each of the fabrics may define its own set of zone groups. As such, connecting the two fabrics may lead to zone group identifier conflicts in which the zone group identifiers assigned to zone groups in one fabric may be the same as (and thus conflict with) zone group identifiers assigned to zone groups in the other fabric.

Accordingly, it may be desirable to resolve the zone group identifier conflicts when two fabrics are connected. In examples described herein, such conflicts may be resolved by renaming the zone groups of one fabric having zone group identifiers that conflict with zone groups identifiers of the other fabric. For example, examples described herein may select the zone manager associated with one of the fabrics to replace the conflicting zone group identifiers in the other fabric with unassigned zone group identifiers. However, replacing the zone group identifiers in a fabric may cause disruption in the fabric.

To address these issues, when two fabrics are connected, examples described herein may select one of the fabrics to have its conflicting zone groups identifiers replaced based on which of the fabrics is predicted to experience the least significant disruption if its conflicting zone group identifiers are replaced. For example, each of the fabrics being connected may be associated with a zone manager and, when the fabrics are connected, one of zone managers may be selected as an active zone manager to replace conflicting zone group identifiers in the other fabric. In examples described herein, the zone manager of the fabric predicted to experience the more significant disruption may be selected as the active zone manager to replace the conflicting identifiers of the other fabric. In such examples, the fabric predicted to experience the less significant disruption may thereby be selected to have its conflicting identifiers replaced. In this manner, examples described herein may reduce the impact of the fabric disruption caused by replacing conflicting zone group identifiers when two fabrics are connected.

Referring now to the drawings, FIG. 1 is a block diagram of an example computing device 100 to determine an active zone manager based on disruption prediction metrics. As used herein, a "computing device" may be a desktop computer, notebook computer, workstation, server, computer networking device, a chip set, or any other processing device or equipment. In the example of FIG. 1, computing device 100 includes a processor 110 and a machine-readable storage medium 120 encoded with instructions 122, 124, 126, 128, and 129. In some examples, storage medium 120 may include additional instructions. In other examples, instructions 122, 124, 126, 128, 129, and any other instructions described herein in relation to storage medium 120 may be stored remotely from computing device 100.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 110 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

In the example of FIG. 1, computing device 100 may implement a first zone manager of a first fabric. In such examples, the first fabric may include at least one storage controller connected to exchange I/O communications with at least one storage device via at least one routing module. As used herein, a "storage controller" is a module able to request I/O operations at any of a plurality of storage devices via at least one routing module. Storage controllers may also request I/O operations at storage devices connected to the storage controller without any intervening routing module. A storage controller may be, for example, a disk array controller, a Serial Attached Small Computer System Interface (SAS) initiator, an initiator of another storage networking protocol (e.g., Fibre Channel Protocol (FCP), etc.), or the like. In some examples, the storage controller may include at least one initiator port through which the storage controller may request I/O operations at a storage device. In some examples, a storage controller may be a hardware device, such as an expansion card (e.g., a Peripheral Component Interconnect (PCI) card), or another type of device comprising a printed circuit board. As used herein, a "storage device" may be any machine-readable storage medium. For example, any storage device described herein may be a SAS drive (e.g., a SAS hard disk drive, a SAS solid-state drive (SSD), etc.), a Serial AT Attachment (SATA) drive (e.g., SATA hard disk drive), or the like.

Also, as used herein, a "routing module" is a switch, expander, or other device or component including a plurality of link interfaces and capable of routing communications received on one link interface of the module to another link interface of the module based on a destination address. A routing module may be, for example, an SAS expander or a SAS switch including a SAS expander. As used herein, a "link interface" is a component of a routing module through which a storage controller, storage device, or other component of a fabric may provide communications to the routing module. A link interface may include, for example, a phy, a port, a wide port, a transceiver, or the like.

In some examples, the first fabric may define zone groups to implement access controls among components (e.g., storage controllers and storage devices) of the first fabric. As used herein, a "zone group" of a fabric may be a set of link interfaces of the fabric having the same access permissions. For example, all of the link interfaces of a given zone group may access (e.g., provide communications to) any other link interface in that zone group and any link interface of any other zone group to which the given zone group is granted access. In some examples, the routing modules including the link interfaces may control access between link interfaces based on zone group membership. In this manner, a routing module may control access between storage controllers and storage devices based on the respective link interfaces to which they are connected.

In examples described herein, a zone manager may manage an associated fabric via any device of the fabric. For example, a zone manager may manage an associated fabric via an initiator port of at least one device of the fabric. In some examples, the zone manager may be implemented by a storage controller (e.g., an initiator) of the associated fabric, a routing module (e.g., a switch or expander) of the fabric, or a computing device connected to a routing module (e.g., an expander) of the fabric. For example, a zone manager may be included in a switch of the associated fabric and connected to an expander of the switch. In other examples, the zone manager may be a computing device connected to a switch of the associated fabric via a sideband communication channel (e.g., an Ethernet connection). In some examples, a zone manager may be implemented in the form of electronic circuitry, in the form of executable instructions encoded on a machine-readable storage medium, or a combination thereof.

As noted above, computing device 100 may implement the first zone manager of the first fabric. In the example of FIG. 1, the first zone manager may be implemented by instructions of storage medium 120. In such examples, the functionalities described below in relation to instructions 122, 124, 126, 128, and 129 may be performed by the first zone manager, along with the other functionalities of the zone manager. In some examples, computing device 100 may be an expander of the first fabric or a switch of the first fabric in which processor 110 is connected to an expander included in the switch. In other examples, computing device 100 may be separate from each routing module of the first fabric, and may be connected to an expander of the first fabric through a sideband connection.

In some examples, a second fabric including at least one storage controller connected to exchange I/O communications with at least one storage device via at least one routing module may be connected to the first fabric. The first and second fabrics may be connected by, for example, connecting a cable between a routing module (e.g., a switch) of the first fabric and a routing module (e.g., a switch) of the second fabric. In response to the connection, the first zone manager may discover and communicate with the second fabric. In such examples, the first zone manager may communicate with a second zone manager associated with the second fabric.

In the example of FIG. 1, in response to discovery of the second fabric, instructions 122 may provide a first disruption prediction metric 192 associated with the first fabric to the second fabric. In addition, instructions 124 may actively or passively acquire (e.g., request or receive) a second disruption prediction metric 194 associated with the second fabric from the second fabric. As used herein, a "disruption prediction metric" associated with a fabric is a characteristic of the fabric that may be compared to a characteristic of another fabric to predict the impact of replacing conflicting zone group identifiers of the fabric relative to the impact of replacing conflicting zone group identifiers of the other fabric when the two fabrics are connected. A disruption prediction metric associated with a fabric may be, for example, a size of the fabric, an estimate of a load on the fabric, an amount of storage devices of the fabric having multiple fabric paths.

Instructions 126 may compare first and second disruption prediction metrics 192 and 194, and instructions 128 may determine, based on a result of the comparison, which of the first zone manager and the second zone manager is an active zone manager. If instructions 128 determine that the first zone manager is the active zone manager, then, in response to that determination, instructions 129 may designate a respective replacement zone group identifier for each zone group of the second fabric assigned a conflicting zone group identifier of the second fabric.

As used herein, a "conflicting zone group identifier" of a given fabric is a zone group identifier, assigned to a configurable zone group of the given fabric, that is equivalent to a zone group identifier assigned to a configurable zone group of another fabric connected to the given fabric. As used herein, a "configurable" zone group of a fabric is a zone group whose access permissions may be changed, defined, or otherwise configured by a user. In examples described herein, any zone group whose access permissions cannot be changed by user is not a configurable zone group. For example, a particular fabric standard, implementation, or the like, may include predefined zone groups whose access permissions are not changeable by a user, and such zone groups are not configurable zone groups in examples described herein. For example, a particular standard may predefine zone group 0-7 (e.g., for administrative purposes) with respective access permissions that cannot be changed by a user. In such examples, the zone group identifiers "0"-"7" are not "conflicting" zone group identifiers in examples described herein, even if used in two connected fabrics.

In some examples, each replacement zone group identifier designated by instructions 129 may be a respective unassigned zone group identifier of the first fabric. As used herein, an "unassigned" zone group identifier of a fabric is a zone group identifier not assigned to any zone group in the fabric. In some examples, a persistent zone group record indicating at least the zone group identifiers assigned in the first fabric may be maintained for the first fabric (e.g., by the first zone manager).

In such examples, instructions 129 may walk through information listing the zone group identifiers assigned in the second fabric (e.g., a zone group table or persistent zone group record of the second fabric) and designate a set of unassigned zone group identifiers of the first fabric as respective replacement zone group identifiers for the conflicting zone group identifiers of the second fabric. In some examples, instructions 129 may determine both the set of conflicting zone group identifiers of the second fabric, and the set of unassigned zone group identifiers of the first fabric to be used as replacement identifiers, based on the persistent zone group record of the first fabric or any other information indicating at least the assigned zone group identifiers of the first fabric.

In some examples, the first fabric (e.g., a protocol or standard utilized by the first fabric) may support a limited number of zone groups (e.g., 128, 256, or any other number) and thus may also support only a limited number of zone group identifiers. In such examples, the number of zone group identifiers of the first fabric that may be used as replacement zone group identifiers may be limited by the total number of zone group identifiers supported by the first fabric and the number of zone group identifiers assigned in the first fabric. Accordingly, in some examples, instructions 129 may determine whether there are a sufficient number of unassigned zone group identifiers in the first fabric to replace each conflicting zone group identifier of the second fabric. If not, instructions 129 may not cause the conflicting zone group identifiers of the second fabric to be replaced. In such examples, the first zone manager may also cease joining the two connected fabrics, leaving them to function as if they were not connected.

If instructions 129 determine that there are a sufficient number of unassigned zone group identifiers, then, after designating the replacement zone group identifiers, instructions 129 may cause the conflicting zone group identifiers to be replaced with the replacement zone group identifiers. For example, instructions 129 may, for each conflicting zone group identifier of the second fabric, replace the conflicting zone group identifier with the designated replacement zone group identifier. In some examples, each assigned zone group identifier of a fabric may be assigned to at least one link interface of the fabric, and may be included in at least one permission table (or any other suitable collection of information) indicating the access permissions of each zone group.

In such examples, to replace the conflicting zone group identifiers of the second fabric, instructions 129 may, for each link interface of the second fabric assigned a conflicting zone group identifier, replace the conflicting zone group identifier assigned to the link interface with the designated replacement zone group identifier. Instructions 129 may also, for each routing module (e.g., expander) of the second fabric including a permission table, update the permission table stored on the routing module such that the access permission relationships between respective zone groups of the second fabric are the same after the replacement of the conflicting zone group identifiers as before the replacement of the conflicting zone group identifiers. For example, if a zone group of the second fabric assigned a zone group identifier "10" has access to a zone group of the second fabric assigned a zone group identifier "11", and zone group identifier "10" of the second fabric is replaced with a replacement zone group identifier "12", then the permission tables may be updated so that the zone group assigned identifier "12" has access to the zone group assigned identifier "11". In such examples, similar permission table updates may be made relative to each replaced zone group identifier.

In other examples, if there are a sufficient number of unassigned zone group identifiers in the first fabric to replace each conflicting zone group identifier of the second fabric, instructions 129 may provide, to the second zone manager, a mapping of the designated replacement zone group identifiers to respective conflicting zone group identifiers. In such examples, the second zone manager may utilize the mapping to replace the identifiers assigned at link interfaces of the second fabric and to update the permission tables in the second fabric.

As noted above, one example of a disruption prediction metric for a fabric may be the size of the fabric. As used herein, the "size" of a fabric may be the number of devices in the fabric. For example, the size of a fabric may be the sum of the number of storage controllers (e.g., initiators), routing modules (e.g., expanders), and storage devices of the fabric. In the example of FIG. 1, the first disruption prediction metric 192 may represent the size of the first fabric and the second disruption prediction metric 194 may represent the size of the second fabric. In such examples, instructions 126 may compare the respective sizes of the first and second fabrics based on metrics 192 and 194, and instructions 128 may determine that the first zone manager is the active zone manager if the size of the first fabric is greater than the size of the second fabric. In such examples, instructions 126 may compare the metrics 192 and 194 to compare the respective sizes of the first and second fabrics, and instructions 128 may determine that the first zone manager is the active zone manager if metric 192 is greater than metric 194.

By selecting the zone manager of the larger fabric as the active zone manager to replace the conflicting zone group identifiers of the smaller fabric, examples described herein may reduce any fabric disruption that may be caused by replacing conflicting zone group identifiers when the two fabrics are connected. In examples described herein, the active zone manager associated with one fabric may replace conflicting zone group identifiers at some or all of the routing modules of the other fabric. Replacing zone group identifiers of routing modules of a fabric may, in some cases, result in disruption of traffic in the fabric. For example, in some fabrics, a change in zone group identifiers may be applied at one routing module at a time. In such examples, if a path from a storage controller to a storage device includes multiple routing modules, a communication from the storage controller may be delayed or fail to reach the storage device if communicated after replacing zone group identifiers at one of the routing modules in the path but before replacing them at all routing modules in the path. For example, a retry message (e.g., an "open reject retry") may be generated in response to communications on this path until the appropriate zone group identifiers are replaced in each routing module of the path.

In some examples, the smaller of two fabrics being joined may be expected to have fewer routing modules, fewer devices connected to those routing modules, or a combination thereof. As such, replacing the conflicting identifiers of the smaller fabric, instead of the larger fabric, may be expected to result in fewer disruptions in traffic as a result of replacing zone group identifiers at routing modules one at a time, as described above.

As noted above, another example of a disruption prediction metric for a fabric may be an estimate of the load on the fabric. For example, in the example of FIG. 1, the first disruption prediction metric 192 may represent a load on the first fabric, the second disruption prediction metric 194 may represent a load on the second fabric, and instructions 128 may determine that the first zone manager is the active zone manager if the estimated load on the first fabric is greater than the estimated load on the second fabric. In some examples, the load on a given fabric may be estimated in a number different ways. For example, the load on a fabric may be estimated based on the total number of requests to open a connection that flow through the various routing modules of the fabric over a given period of time. In such examples, such a request may be any request to open a connection with another device of the fabric. In other examples, the load on a fabric may be estimated based on both the number of requests to open a connection during the given time period and the length of time the connections are kept open.

By selecting the zone manager of the fabric estimated to have the larger load as the active zone manager to replace the conflicting zone group identifiers of the fabric having the lesser load, examples described herein may reduce the impact of the fabric disruption caused by replacing conflicting zone group identifiers when the two fabrics are connected. For example, in some fabrics, after zone group identifiers are replaced in a routing module, the routing module will output a broadcast change communication, which will be forwarded to all devices in the fabric, causing each device to begin a discovery process that includes outputting its own broadcast change communications. Such a chain of events may lead to the creation of much traffic in the fabric, which will be disruptive to other traffic (e.g., I/O communications) in the fabric. As such, in examples described herein, replacing the conflicting zone group identifiers of the fabric estimated to have the smaller load, instead of the fabric estimated to have the larger load, may be expected to result in less disruption in traffic when joining two fabrics, since there may be less traffic to be disrupted in the fabric estimated to have the smaller load.

As noted above, in some examples, the first zone manager may implement the functionalities of the instructions of storage medium 120. In such examples, the first zone manager may compare the first and second disruption prediction metrics 192 and 194, and determine, based on a result of the comparison, whether or not it is the active zone manager, as described above in relation to instructions 126 and 128. In such examples, the first zone manager may also designate replacement zone group identifiers, and cause the conflicting zone group identifiers of the second fabric to be replaced with the designated replacement zone group identifiers, as described above in relation to instructions 129.

In some examples, instructions 128 may determine which of the first and second zone managers is the active zone manager based on a first plurality of disruption prediction metrics for the first fabric and a second plurality of disruption prediction metrics for the second fabric. In such examples, instructions 126 may compare metrics of the first plurality to metrics of the second plurality, and instructions 128 may determine which zone manager is the active zone manager based on the results of comparing the pluralities of metrics. For example, instructions 126 may compare metrics of the first and second pluralities in a hierarchical manner. In such examples, instructions 126 may compare a metric of the first plurality (e.g., a size metric) to a corresponding metric of the second plurality (e.g., a size metric), and if one of the metrics is greater, instructions 128 may determine the active zone manager based on the comparison. If the metrics are equivalent, instructions 126 may compare another metric of the first plurality (e.g., a load metric) to another metric of the second plurality (e.g., a load metric), and if one of the metrics is greater, instructions 128 may determine the active zone manager based on the comparison. Instructions 126 may continue this process for any number of metrics. If all the metrics are equivalent, instructions 126 may compare addresses of routing modules in each fabric, and instructions 128 may determine the active zone manager based on the comparison, as described below in relation to FIG. 5. In other examples, instructions 126 may combine the first plurality of metrics (e.g., calculate a weighted sum of the metrics), combine the second plurality of metrics (e.g., calculate a weighted sum of the metrics), and compare the weighted sums. In such examples, instructions 128 may determine the active zone manager based on the comparison. In some examples, functionalities described herein in relation to FIG. 1 may be provided in combination with functionalities described herein in relation to any of FIGS. 2A-5.

Figure 2A:
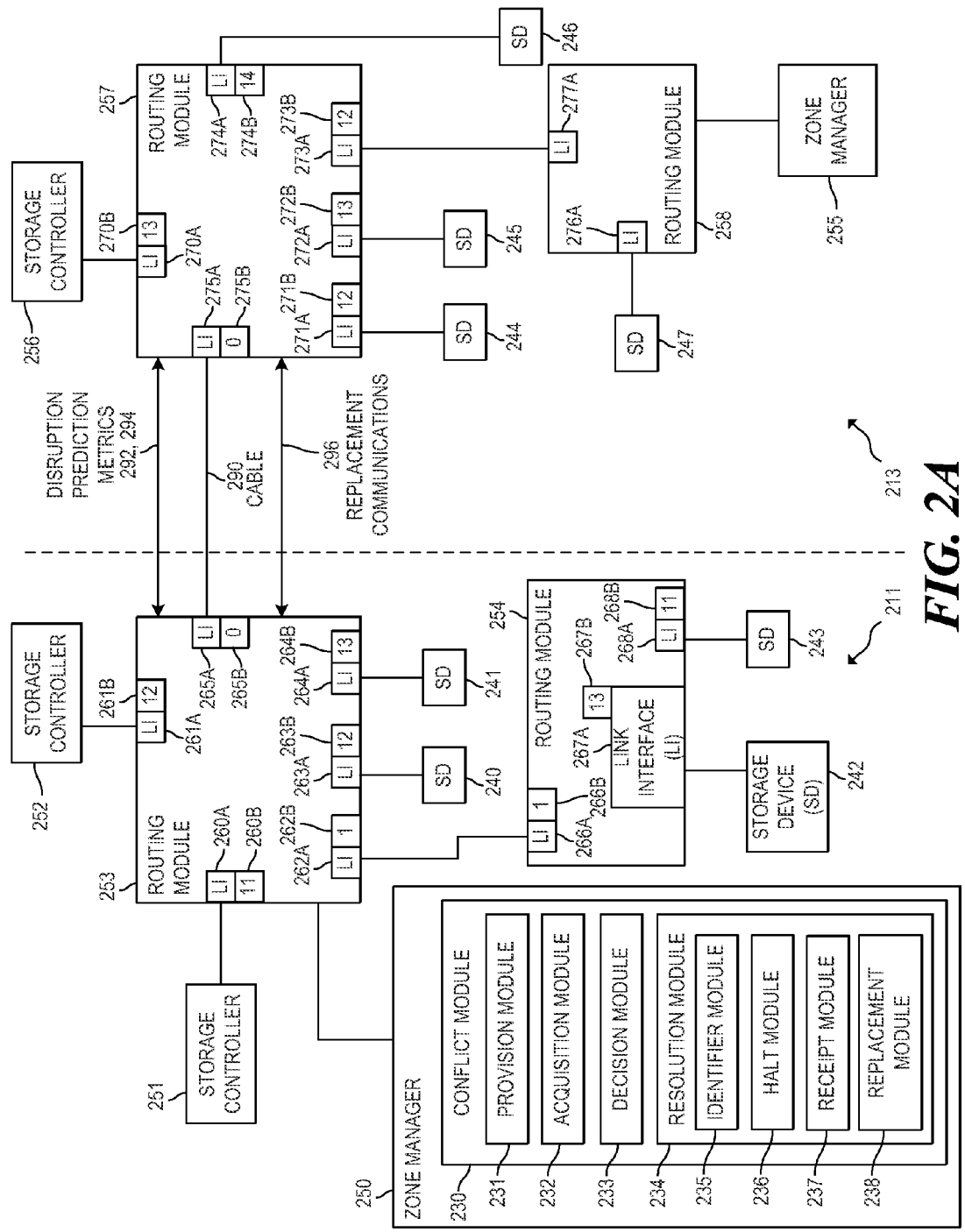
FIG. 2A is a diagram of example connected fabrics having conflicting zone group identifiers.

FIG. 2A is a diagram of example connected fabrics having conflicting zone group identifiers. In the example of FIG. 2A, a first fabric 211 includes a zone manager 250, storage controllers 251 and 252, routing modules 253 and 254, and storage devices 240-243. Zone manager 250 may include a conflict module 230, including modules 231-238. In some examples, zone manager 250 and conflict module 230 may include additional modules. The functionalities of zone manager 250, including the functionalities of modules 230-238, may be implemented in the form of executable instructions encoded on a machine-readable storage medium, in the form of electronic circuitry, or a combination thereof. A second fabric 213 includes a zone manager 255, a storage controller 256, routing modules 257 and 258, and storage devices 244-247. In the example of FIG. 2A, zone manager 255 may perform any of the functionalities described herein in relation to zone manager 250, but for fabric 213 rather than for fabric 211.

In the example of FIG. 2A, routing module 253 may implement zoning and include a plurality of link interfaces 260A-265A assigned zone group identifiers 260B-265B, respectively. In examples described herein, a routing module that implements zoning is a routing module capable of controlling access between link interfaces based on the zone groups to which the link interfaces are assigned and the access permissions between the zone groups. Storage controller 251 is connected to link interface 260A which is assigned zone group identifier 260B ("11" in FIG. 2A). Link interfaces assigned zone group identifier "11" may be referred to herein as part of "zone group 11".

Storage controller 252 is connected to link interface 261A which is assigned zone group identifier 261B ("12" in FIG.

2A). Link interfaces assigned zone group identifier "12" may be referred to herein as part of "zone group 12". Storage device 240 is connected to link interface 263A, which is assigned zone group identifier 263B ("12" in FIG. 2A). Storage device 241 is connected to link interface 264A, which is assigned zone group identifier 264B ("13" in FIG. 2A). Link interfaces assigned zone group identifier "13" may be referred to herein as part of "zone group 13".

Routing module 254 is connected to link interface 262A which is assigned zone group identifier 262B ("1" in FIG. 2A). Link interfaces assigned zone group identifier "1" may be referred to herein as part of "zone group 1". In the example of FIG. 2A, routing module 254 may also implement zoning, and zone group 1 may be a predefined zone group for link interfaces connecting routing modules that implement zoning. In such examples, routing modules may use link interfaces assigned to zone group 1 to access other routing modules and any zone group through those routing modules. In examples described herein, the access permissions of predefined zone group 1 are not changeable by a user, and as such, predefined zone group 1 is not a configurable zone group in examples described herein.

In the example of FIG. 2A, fabrics 211 and 213 are stacked (or otherwise connected) by connecting routing module 253 of fabric 211 to routing module 257 of fabric 213 using any suitable connection. For example, a link interface 265A of routing module 253 may be connected to routing module 257 with a cable 290. In the example of FIG. 2A, link interface 265A is assigned zone group identifier 265B ("0" in FIG. 2A). Link interfaces assigned zone group identifier "0" may be referred to herein as part of "zone group 0". In some examples, zone group 0 may be another predefined zone group. For example, zone group 0 may be a default zone group to which a link interface is assigned in response to a connection being made with the link interface. In such examples, zone managers may have exclusive access to link interfaces of zone group 0 (e.g., until the link interface is assigned to another zone group), and may use a link interface of zone group 0 access any zone group. In examples described herein, the access permissions of predefined zone group 0 are not changeable by a user, and as such, predefined zone group 0 is not a configurable zone group in examples described herein.

In the example of FIG. 2A, routing module 254 may implement zoning and include a plurality of link interfaces 266A-268A assigned zone group identifiers 266B-268B, respectively. Routing module 253 is connected to link interface 266A which is assigned zone group identifier 266B ("1" in FIG. 2A). Storage device 242 is connected to link interface 267A which is assigned zone group identifier 267B ("13" in FIG. 2A). Storage device 243 is connected to link interface 268A which is assigned zone group identifier 268B ("11" in FIG. 2A). Although each zone group identifier assigned to a link interface of a routing module is illustrated adjacent to the link interface in the example of FIG. 2A, routing modules may store the identifiers and associate them with link interfaces in any suitable manner.

In the example of FIG. 2A, zone manager 250 may be the zone manager of fabric 211 and may manage fabric 211. In some examples, zone manager 250 may be separate from and connected to any routing module of fabric 211. In the example of FIG. 2A, zone manager 250 is connected to routing module 253. In other examples, zone manager 250 may be included in one of the routing modules of fabric 211.

In the example of FIG. 2A, cable 290 connects routing module 253 of fabric 211 and routing module 257 of fabric 213. In some examples, routing module 253 may be an expander included in a switch (e.g., a SAS switch) of fabric 211, and routing module 257 may be an expander included in a switch (e.g., a SAS switch) of fabric 213. In response to connecting routing modules 253 and 257, zone manager 250 may discover and communicate with fabric 213. For example, in response to connecting routing modules 253 and 257, zone manager 250 may discover that a new switch (e.g., routing module 257, or a switch including routing module 257) has been connected to routing module 253. In some examples, zone manager 250 may determine that a newly connected device is a switch based on, for example, the product identifier of the newly connected device. In some examples, the discovery of a newly connected switch may trigger zone manager 250 to perform a zone conflict resolution process described below in relation to conflict module 230. In such examples, zone manager 250 may consider the newly connected switch to be a switch of another fabric. In the example of FIG. 2A, the other fabric is fabric 213.

In some examples, in response to the discovery of the newly connected switch of another fabric (i.e., fabric 213), provision module 231 may provide a first disruption prediction metric 292 associated with fabric 211 to zone manager 255 of fabric 213, and acquisition module 232 may acquire a second disruption prediction metric 294 associated with fabric 213 from zone manager 255. Decision module 233 may compare first and second disruption prediction metrics 292 and 294, and determine, based on a result of the comparison, which of zone managers 250 and 255 is an active zone manager. In some examples, decision module 233 may determine the active zone manager based on a first plurality of disruption prediction metrics for the first fabric, and a second plurality of disruption prediction metrics for the second fabric, as described above in relation to instructions 126 and 128 of FIG. 1. In such examples, decision module 233 may compare the first plurality of metrics to the second plurality of metrics, and determine the active zone manager based on at least one such comparison, as described above in relation to instructions 126 and 128 of FIG. 1.

In some examples, disruption prediction metrics 292 and 294 may represent a size of fabric 211 and a size of fabric 213, respectively, as described above in relation to FIG. 1. In such examples, metric 292 may represent a fabric size of eight, representing the count of two storage controller 252 and 253, two routing modules 253 and 254, and four storage devices 240-243 of fabric 211. Additionally, metric 294 may represent a fabric size of seven, representing the count of one storage controller 256, two routing modules 257 and 258, and four storage devices 244-247 of fabric 213. In such examples, decision module 233 may determine that zone manager 250 is the active zone manager since the size of fabric 211 is greater than the size of fabric 213, as indicated by metrics 292 and 294. In other examples, fabrics 211 and 213 may each have any size, and module 233 may determine that zone manager 255 is the active zone manager if fabric 213 is larger than fabric 211.

In other examples, disruption prediction metrics 292 and 294 may represent an estimate of a load on fabric 211 and an estimate of a load on fabric 213, respectively, as described above in relation to FIG. 1. In other examples, each disruption prediction metric may be, for example, an amount of storage devices having multiple fabric paths in a fabric, or any other suitable disruption prediction metric.

In the example of FIG. 2A, routing module 257 of fabric 213 may implement zoning and include a plurality of link interfaces 270A-275A assigned zone group identifiers 270B-275B, respectively. Storage controller 256 is connected to link interface 270A which is assigned zone group identifier 270B ("13" in FIG. 2A). Storage device 244 is connected to link interface 271A, which is assigned zone group identifier 271B ("12" in FIG. 2A). Storage device 245 is connected to link interface 272A, which is assigned zone group identifier 272B ("13" in FIG. 2A). Storage device 246 is connected to link interface 274A, which is assigned zone group identifier 274B ("14" in FIG. 2A). Link interfaces assigned zone group identifier "14" may be referred to herein as part of "zone group 14". Routing module 253 of fabric 211 is connected to link interface 270A, which is assigned zone group identifier 270B ("0" in FIG. 2A).

Routing module 258 is not implementing zoning in the example of FIG. 2A, and is connected to link interface 273A that is assigned zone group identifier 273B ("12" in FIG. 2A). In such examples, each link interface of routing module 258 is considered a part of the zone group to which link interface 273A is assigned, since routing module 258 is not implementing zoning. Routing module 258 includes a link interface 276A connected to storage device 247 and a link interface 277A connected to routing module 257. In the example of FIG. 2A, zone manager 255 is connected to routing module 258. In other examples, zone manager 250 may be included in one of the routing modules of fabric 213.

If module 233 determines that zone manager 250 is the active zone manager, then, in response to that determination, resolution module 234 may designate a respective replacement zone group identifier for each zone group of fabric 213 assigned a conflicting zone group identifier of fabric 213, as described above in relation to FIG. 1. In some examples, each replacement zone group identifier designated by module 234 may be a respective unassigned zone group identifier of fabric 211. In such examples, an identifier module 235 may walk through information listing the zone group identifiers assigned in fabric 213 (e.g., a zone group table or persistent zone group record of fabric 213) and designate a set of unassigned zone group identifiers of fabric 211 as respective replacement zone group identifiers for the conflicting zone group identifiers of fabric 213, as described above in relation to FIG. 1. For example, module 233 may compare the zone group identifiers assigned to configurable zone groups of fabric 213 (e.g., identifiers 12, 13, and 14) to zone group identifiers assigned to configurable zone groups of fabric 211 (e.g., identifiers 11, 12, 13) and determine that the conflicting zone group identifiers of fabric 213 are identifiers 12 and 13. In such examples, module 233 may also designate respective unassigned zone group identifiers of fabric 211 to the conflicting zone group identifiers of fabric 213. For example, module 233 may designate replacement identifier 15 for conflicting identifier 12 and designate replacement identifier 16 for conflicting identifier 13.

In some examples, module 235 may also determine whether there are a sufficient number of unassigned zone group identifiers in fabric 211 to replace each conflicting zone group identifier of fabric 213. If not, a halt module 236 may halt a process of joining fabrics 211 and 213, leaving them to function as if they were not connected. In such examples, module 235 may determine whether there are sufficient unassigned identifiers prior to designating any replacement identifiers or while designating replacement identifiers.

If module 235 determines that there are sufficient unassigned zone group identifiers, then, after designating the replacement zone group identifiers, resolution module 234 may cause the conflicting zone group identifiers of fabric 213 to be replaced with the replacement zone group identifiers, as described above in relation to FIG. 1. For example, a replacement module 238 may replace each conflicting zone group identifier of fabric 213 with the designated replacement zone group identifier. In such examples, module 238 may, for each link interface of fabric 213 assigned a conflicting zone group identifier, replace the conflicting zone group identifier assigned to the link interface with the designated replacement zone group identifier. For example, in the example of FIG. 2A, module 238 may replace conflicting zone group identifier 12 assigned to link interfaces 271A and 273A with replacement zone group identifier 15, and replace conflicting zone group identifier 13 assigned to link interfaces 270A and 272A with replacement zone group identifier 16 (see FIG. 2B, described below).

In such examples, module 238 may also, for each routing module of fabric 213 including a permission table (e.g., routing module 257 implementing zoning), update the permission table stored on the routing module such that the access permission relationships between respective zone groups of fabric 213 are the same after the replacement of the conflicting zone group identifiers as before the replacement of the conflicting zone group identifiers. In some examples, module 238 may similarly update the permission tables of each routing module of fabric 211 including a permission table.

In other examples, if there are a sufficient number of unassigned zone group identifiers in fabric 211 to replace each conflicting zone group identifier of fabric 213, module 238 may provide, to zone manager 255, a mapping of the designated replacement zone group identifiers to respective conflicting zone group identifier. In such examples, the second zone manager may utilize the mapping to replace the identifiers assigned at link interface of the second fabric and to update the permission tables in the second fabric. In the example of FIG. 2A, the mapping may indicate that conflicting zone group identifier 12 is to be replaced with identifier 15 and that conflicting zone group identifier 13 is to be replaced with identifier 16.

In some examples, decision module 233 may determine, based on disruption prediction metrics 292 and 294, that zone manager 250 is a subordinate zone manager, rather than the active zone manager. For example, module 233 may determine that zone manager 250 is a subordinate zone manager if it determines that zone manager 255 is the active zone manager. For example, if metrics 292 and 294 represent fabric size, then module 233 may determine that zone manager 250 is a subordinate zone manager if the metrics indicate that fabric 213 is larger than fabric 211.

In such examples, active zone manager 255 may replace conflicting zone group identifiers in fabric 211, as described above in relation to zone manager 250. In other examples, active zone manager 255 may provide a mapping of replacement identifiers to conflicting identifiers for fabric 211 to zone manager 250. In such examples, a receipt module 237 of zone manager 250 may receive the mapping of replacement zone group identifiers to conflicting zone group identifiers of fabric 211. In such examples, module 238 may replace the conflicting zone group identifiers with the respective replacement zone group identifiers designated in the mapping at each routing module (e.g., expander) implementing zoning in fabric 211. For example, module 238 may replace the conflicting identifiers for each link interface assigned a conflicting interface, and may update the permission tables of routing modules implementing zoning, as described above in relation to FIG. 1. In some examples, functionalities described herein in relation to FIG. 2A may be provided in combination with functionalities described herein in relation to any of FIGS. 1 and 2B-5.

Figure 2B:
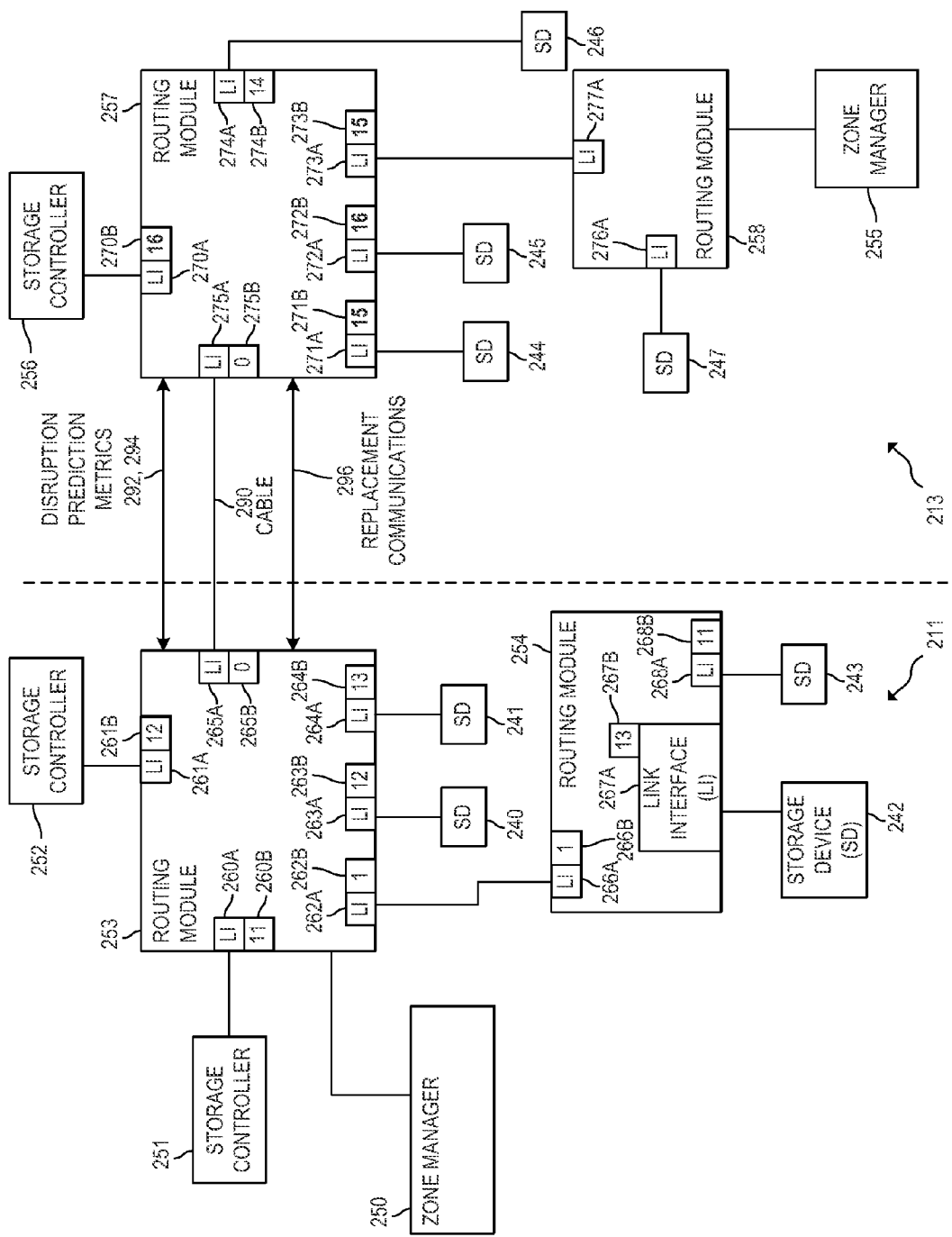
FIG. 2B is a diagram of the example connected fabrics of FIG. 2A after replacement of conflicting zone group identifiers of one of the fabrics.

FIG. 2B is a diagram of the connected fabrics 211 and 213 of FIG. 2A after replacement of the conflicting zone group identifiers of one of the fabrics. As described above in relation to FIG. 2A, zone manager 250 may be selected as the active zone manager and cause the conflicting zone group identifiers of fabric 213 to be replaced. For example, as shown in FIGS. 2A and 2B, zone manager 250 may replace (or cause zone manager 255 to replace) the conflicting zone group identifier "12" assigned to each of link interfaces 271A and 273A with replacement zone group identifier "15". In such examples, as shown in FIG. 2B, after the replacement, zone group identifiers 271B and 273B assigned to link interfaces 271A and 273A, respectively, are each replacement identifier "15". Additionally, as shown in FIGS. 2A and 2B, zone manager 250 may replace (or cause zone manager 255 to replace) the conflicting zone group identifier "13" assigned to each of link interfaces 270A and 272A with replacement zone group identifier "16". In such examples, as shown in FIG. 2B, after the replacement, zone group identifiers 270B and 272B assigned to link interfaces 270A and 272A, respectively, are each replacement identifier "16".

FIG. 2C is a diagram of example permission tables 280A and 280B for fabrics 211 and 213 of FIG. 2A, respectively. FIG. 2D is a diagram of an example updated permission table 280C of routing module 256 of fabric 213 of FIG. 2A after resolution of zone group identifier conflicts. Example functionalities of zone manager 250 are described below in relation to FIGS. 2C and 2D. In the examples of FIGS. 2C and 2D, each of permission tables 280A-280C includes a row and a column for each configurable zone group, where each row indicates which zone groups the zone group associated with the row may access (illustrated with a "P" in FIGS. 2C and 2D). In the examples of FIGS. 2C and 2D, although not explicitly shown in the permission tables, each zone group may access link interfaces in the same zone group. Although the illustrations of permission tables 280A-280C omit the access permissions of predefined zone groups not considered in the conflict resolution process (e.g., predefined zone groups 0 and 1, which are not configurable zone groups), the permission tables may include the access permissions of those zone groups. In other examples, the access permissions of the zone groups may be represented in any other suitable manner.

In the example of FIG. 2C, permission table 280A may be a permission table of at least routing module 253 of fabric 211. Any other routing module of fabric 211 implementing zoning may also include permission table 280A. Permission table 280A may indicate the access permissions among zone groups of fabric 211. In permission table 280A, row 281A indicates that zone group 11 may access zone group 12, row 282A indicates that zone group 12 may access zone groups 11 and 13, and row 283A indicates that zone group 13 may not access zone groups 11 or 12 (although link interfaces of zone group 13 may access each other).

Permission table 280B may be a permission table of at least routing module 257 of fabric 213. Any other routing module of fabric 213 implementing zoning may also include permission table 280B. Permission table 280B may indicate the access permissions among zone groups of fabric 213. In permission table 280B, row 281B indicates that zone group 12 may access zone group 14, row 282B indicates that zone group 13 may access zone groups 12 and 14, and row 283B indicates that zone group 14 may not access zone groups 12 or 13 (although link interfaces of zone group 14 may access each other).

In the example of FIGS. 2A-2D, replacement module 238 may replace conflicting zone group identifiers of fabric 213, as described above in relation to FIGS. 1 and 2A. For example, as described in relation to FIGS. 2A and 2B, if zone manager 250 is the active zone manager, replacement module 238 may replace conflicting identifiers 12 and 13 of fabric 213 with replacement identifiers 15 and 16.

In such examples, module 238 may update a permission table stored on a routing module of fabric 213 such that the access permission relationships between respective zone groups of fabric 213 are the same after the replacement of the conflicting zone group identifiers as before the replacement of the conflicting zone group identifiers, as described above in relation to FIGS. 1 and 2A. For example, module 238 may update permission table 280B of routing module 257 to include the information illustrated in updated permission table 280C of FIG. 2D. In the example of FIG. 2D, updated permission table 280C includes the access permissions of assigned zone groups 11, 12, and 13 of fabric 211, as well as the access permissions of zone groups 14, 15, and 16 of fabric 213, wherein zone groups 15 and 16 are the zone groups previously assigned conflicting identifiers 12 and 13. In such examples, the access permission relationships between respective zone groups of fabric 213 in updated permission table 280C after the replacement of the conflicting zone group identifiers are the same as the access permission relationships between respective zone groups of fabric 213 in permission table 280B before the replacement of the conflicting zone group identifiers.

For example, as noted above, in the example of FIGS. 2A-2D, zone group identifier 12 of fabric 213 is replaced with zone group identifier 15. In updated permission table 280C, zone group 15 has access to zone group 14, just as zone group 12 of fabric 213 had access to zone 14 of fabric 213 before the replacement of the conflicting identifiers. Additionally, as noted above, in the example of FIGS. 2A-2D, zone group identifier 13 of fabric 213 is replaced with zone group identifier 16. In updated permission table 280C, zone group 16 has access to zone groups 14 and 15, just as conflicting zone group 13 of fabric 213 had access to zone groups 14 and 12 (now 15) of fabric 213 before the replacement of the conflicting identifiers. Also, in the example of FIG. 2D, updated permission table 280C includes the access permissions of the zone groups of fabric 211 so that access permissions may be consistent across connected fabrics 211 and 213. In some examples, the permission tables of routing modules of fabric 211 may also be updated to include the information illustrated in updated permission table 280C.

Figure 3:
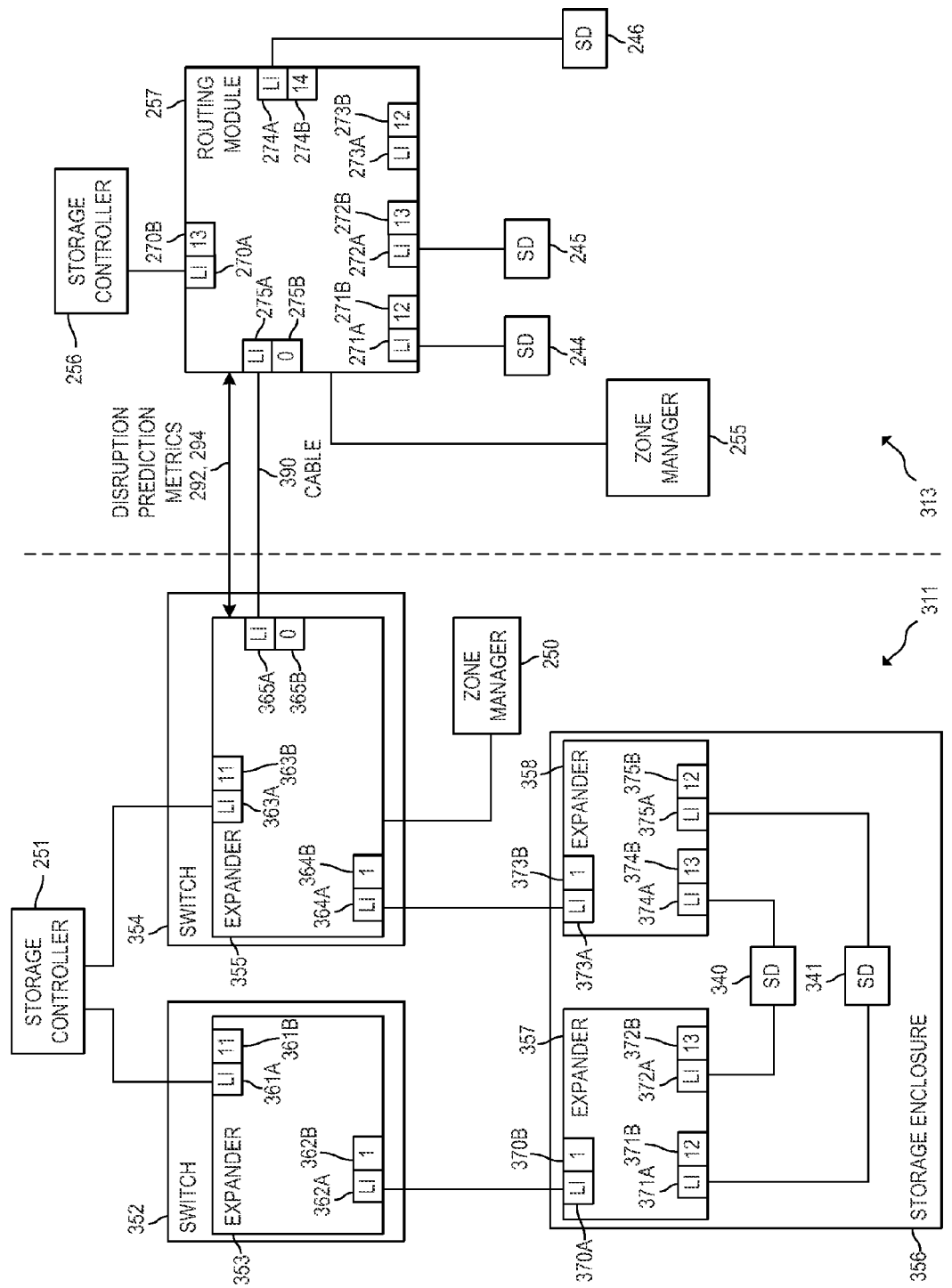
FIG. 3 is a diagram of example connected fabrics having conflicting zone group identifiers, wherein one of the fabrics implements a dual domain configuration.

FIG. 3 is a diagram of example connected fabrics 311 and 313 having conflicting zone group identifiers, wherein fabric 311 implements a dual domain configuration. In the example of FIG. 3, fabric 311 includes storage controller 251 and zone manager 250, as described above in relation to FIG. 2A. Fabric 311 also includes switches 352 and 354, and a storage enclosure 356. Switch 352 includes an expander 353, switch 354 includes an expander 355, and storage enclosure 356 includes expanders 357 and 358 and storage devices 340 and 341. Fabric 313 is the same as fabric 213 described above in relation to FIG. 2A, except that fabric 313 omits routing module 258 and storage device 247, and zone manager 255 is connected to routing module 257.

In the example of FIG. 3, fabric 311 includes a dual-domain configuration in relation to the storage devices of storage enclosure 356. For example, storage controller 251 may communicate with storage device 340 via a first fabric path including switch 354 and expander 358 or via a second fabric path, independent of the first fabric path, including switch 352 and expander 357. Also, in the example of FIG. 3, storage controller 251 may communicate with storage device 341 via a third fabric path including switch 354 and expander 358 or via a fourth fabric path, independent of the third fabric path, including switch 352 and expander 357. Accordingly, in the example of FIG. 3, fabric 311 includes multiple fabric paths for each of storage devices 340 and 341. As used herein, a "fabric path" is a collection of interconnected components of a fabric that form a route through which a storage controller of the fabric may communicate with a storage device of the fabric.

In the example of FIG. 3, zone manager 255 of fabric 313 may include a conflict module 230, as described above in relation to zone manager 250. In such examples, in response to connecting fabrics 311 and 313 (e.g., via a cable 390), a provision module 231 of zone manager 255 may provide, to zone manager 250 of fabric 311, a disruption prediction metric 294, and an acquisition module 232 of zone manager 255 may acquire, from zone manager 250, a disruption prediction metric 292. In the example of FIG. 3, metric 292 may represent an amount of storage devices of fabric 311 for which fabric 311 has multiple fabric paths. For example, metric 292 may indicate that fabric 311 includes multiple fabric paths for 100 percent its storage devices. In other examples, the amount of storage device may be represented in any other suitable manner (e.g., a number of devices, etc.). In such examples, metric 294 may represent an amount of storage devices of fabric 313 for which fabric 313 has multiple fabric paths. For example, metric 294 may indicate that fabric 313 includes multiple fabric paths for none of its storage devices.

In some examples, a decision module 233 of zone manager 255 may determine that zone manager 255 is the active zone manager if disruption prediction metrics 292 and 294 indicate that the amount of storage devices having multiple fabric paths is greater in fabric 311 than in fabric 313. In such examples, if zone manager 255 is the active zone manager and there are sufficient unassigned zone group identifiers of fabric 313, a resolution module 234 of zone manager 255 may replace each conflicting zone group identifier of fabric 311 with a respective unassigned zone group identifier of fabric 313.

In the example of FIG. 3, a replacement module 238 of zone manager 255 may, for each storage device of fabric 311 for which the fabric has multiple fabric paths, replace conflicting zone group identifiers assigned to link interfaces in one of the fabric paths before replacing any conflicting zone group identifier assigned to any link interface in another of the fabric paths. For example, zone manager 255 may replace conflicting zone group identifiers in the first fabric path to storage device 340 before replacing any conflicting zone group identifier in the second fabric path to storage device 340. Similarly, zone manager 255 may replace conflicting zone group identifiers in the third fabric path to storage device 341 before replacing any conflicting zone group identifier in the fourth fabric path to storage device 341. In this manner, examples described herein may replace conflicting zone group identifiers in fabric 311 without any disruption in traffic since there are two fabric paths to each storage device in fabric 311 and conflicting zone group identifiers are replaced in one of those paths at a time. In such examples, whenever zone group identifiers are being replaced in one fabric path to a storage device, the other fabric path to the storage device may be used for I/O communications between the storage device and a storage controller. Additionally, by determining an active zone manager based on which fabric has the greater amount of storage devices having multiple fabric paths, examples described herein may reduce the impact of fabric disruption caused by replacing conflicting zone groups identifiers when two fabrics are connected by replacing conflicting identifiers in the fabric with the greatest amount of storage devices having multiple fabric paths. Also, as noted above, in some examples, whenever zone group identifiers are being replaced in one fabric path to a storage device, the other fabric path to the storage device may be used for I/O communications. As such, in some examples, broadcast change communications triggered by replacing zone group identifiers in one of the fabric paths may not reach the other fabric path and thus may not impact the traffic (e.g., I/O communications) on the other path.

In the example of FIG. 3, expanders 353, 355, 357, and 358 all implement zoning. Expander 353 includes link interfaces 361A and 362A assigned zone group identifiers 361B ("11") and 362B ("1"), respectively. Expander 355 includes link interfaces 363A, 364A, and 365A assigned zone group identifiers 363B ("11"), 364B ("1"), and 365B ("0"), respectively. Expander 357 includes link interfaces 370A, 371A, and 372A assigned zone group identifiers 370B ("1"), 371B ("12"), and 372B ("13"), respectively. Expander 358 includes link interfaces 373A, 374A, and 375A assigned zone group identifiers 373B ("1"), 374B ("13"), and 375B ("12"), respectively.

Additionally, storage controller 251 is connected to link interface 361A of expander 353 and link interface 363A of expander 355. Link interface 362A of expander 353 is connected to link interface 370A of expander 357, and link interface 364A of expander 355 is connected to link interface 373A of expander 358. In storage enclosure 356, storage device 340 is connected to link interface 372A of expander 357 and link interface 374A of expander 358. Additionally, storage device 341 is connected to link interface 371A of expander 357 and link interface 375A of expander 358.

In the example of FIG. 3, an identifier module 235 of zone manager 255 may designate replacement zone group identifiers 15 and 16 to replace conflicting zone group identifiers 12 and 13, respectively, of fabric 311. In such examples, replacement module 238 of zone manager 255 may replace conflicting zone group identifiers in expander 357 before replacing them in expander 358. In this manner, when link interfaces 371A and 372A are disrupted to replace identifiers 371B and 372B, storage controller 251 may continue to have uninterrupted access to storage devices 340 and 341 via expander 358. In such examples, replacement module 238 of zone manager 255 may also replace conflicting zone group identifiers in expander 358 after replacing them in expander 357. In this manner, when link interfaces 374A and 375A are disrupted to replace identifiers 374B and 375B, storage controller 251 may continue to have uninterrupted access to storage devices 340 and 341 via expander 357.

In other examples, decision module 233 may determine that zone manager 255 is a subordinate zone manager if disruption prediction metrics 292 and 294 indicate that the amount of storage devices having multiple storage domain paths is greater in fabric 313 than in fabric 311. In some examples, if decision module 233 determines that disruption prediction metrics 292 and 294 representing the amount of storage devices having multiple fabric paths are equivalent, decision module 233 may determine whether zone manager 255 is an active zone manager based on a comparison of other disruption prediction metrics of fabrics 311 and 313, such as metrics representing fabric size, load, or the like, as described above in relation to FIGS. 1 and 2A. In such examples, the additional metrics may be exchanged by zone manager 250 and 255 upon determining that the first metrics exchanged are equivalent, or at the same time as the exchange of metrics 292 and 294. In the example of FIG. 3, zone manager 250 may perform any of the functionalities described herein in relation to zone manager 255, but for fabric 311 rather than fabric 313. In some examples, functionalities described herein in relation to FIG. 3 may be provided in combination with functionalities described herein in relation to any of FIGS. 1-2D and 4-5.

Figure 4:
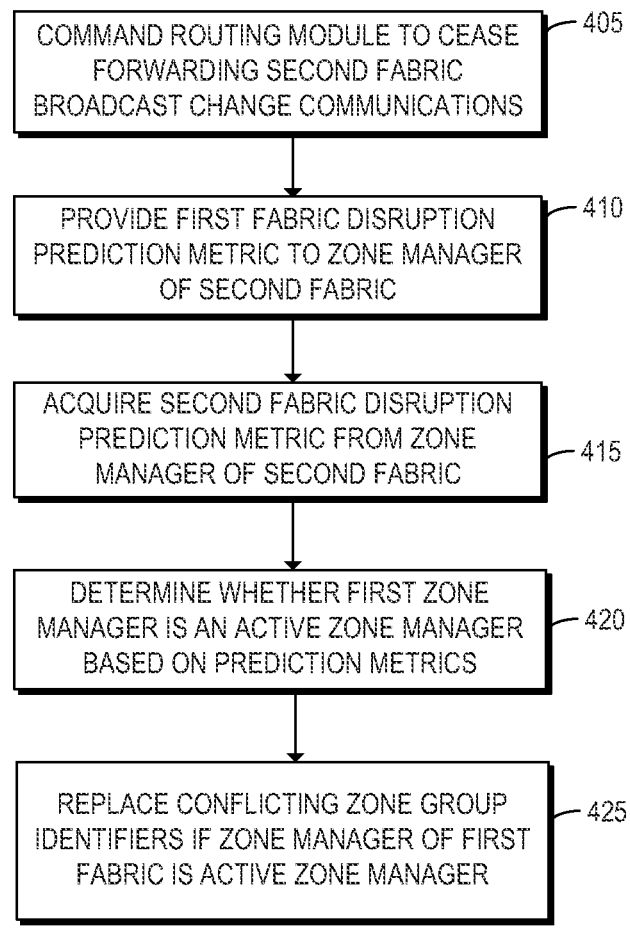
FIG. 4 is a flowchart of an example method for preventing broadcast change communications from being forwarded during the resolution of zoning conflicts.

FIG. 4 is a flowchart of an example method 400 for preventing broadcast change communications from being forwarded during the resolution of zoning conflicts. Although execution of method 400 is described below with reference to zone manager 250 of FIG. 2A, other suitable components for execution of method 400 can be utilized (e.g., computing device 100, zone manager 255, etc.). Additionally, method 400 may be implemented in the form of executable instructions encoded on a machine-readable storage medium, in the form of electronic circuitry, or a combination thereof.

At 405 of method 400, zone manager 250 of fabric 211 may, in response to discovery of a switch of another fabric (e.g., routing module 257 of fabric 213), command routing module 253 of fabric 211 to cease forwarding broadcast change communications received from fabric 213. In some examples, when a new device is connected to a fabric, it will output a broadcast change communication, which expanders in the fabric will forward to all devices in the fabric, causing each device to begin a discovery process that includes outputting its own broadcast change communications. Such a chain of events may lead to the creation of much traffic in the fabric. For example, the connection of fabrics 211 and 213 may cause each device in each fabric to begin discovery. As such, commanding routing module 253 (connecting fabric 211 to fabric 213) not to forward broadcast change communications from fabric 213 may limit traffic in fabric 211 during a conflict resolution process, and limit discovery across the fabrics until after the conflict resolution process determines that the two fabrics will be joined.

At 410, zone manager 250 may provide a disruption prediction metric 292 to a zone manager 255 of fabric 213, in response to the discovery of the switch of fabric 213. At 415, zone manager 250 may acquire a disruption prediction metric 294 from zone manager 255, in response to the discovery of the switch of fabric 213. In some examples, the disruption prediction metric may be, for example, a size of the fabric, an estimate of a load on the fabric, an amount of storage devices of the fabric having multiple fabric paths, or the like. For example, metric 292 may represent a size of fabric 211 and metric 294 may represent a size of fabric 213.

At 420, zone manager 250 may determine that zone manager 250 is an active zone manager based on disruption prediction metrics 292 and 294. For example, zone manager 250 may determine that zone manager 250 is an active zone manager if disruption prediction metrics 292 and 294 indicate that the size of fabric 211 is greater than the size of fabric 213. At 425, in response to a determination that zone manager 250 is the active zone manager, zone manager 250 may replace each conflicting zone group identifier of fabric 213 with a respective unassigned zone group identifier of fabric 211, if there are sufficient unassigned zone group identifiers of fabric 211. In some examples, functionalities described herein in relation to FIG. 4 may be provided in combination with functionalities described herein in relation to any of FIGS. 1-3 and 5.

Figure 5:
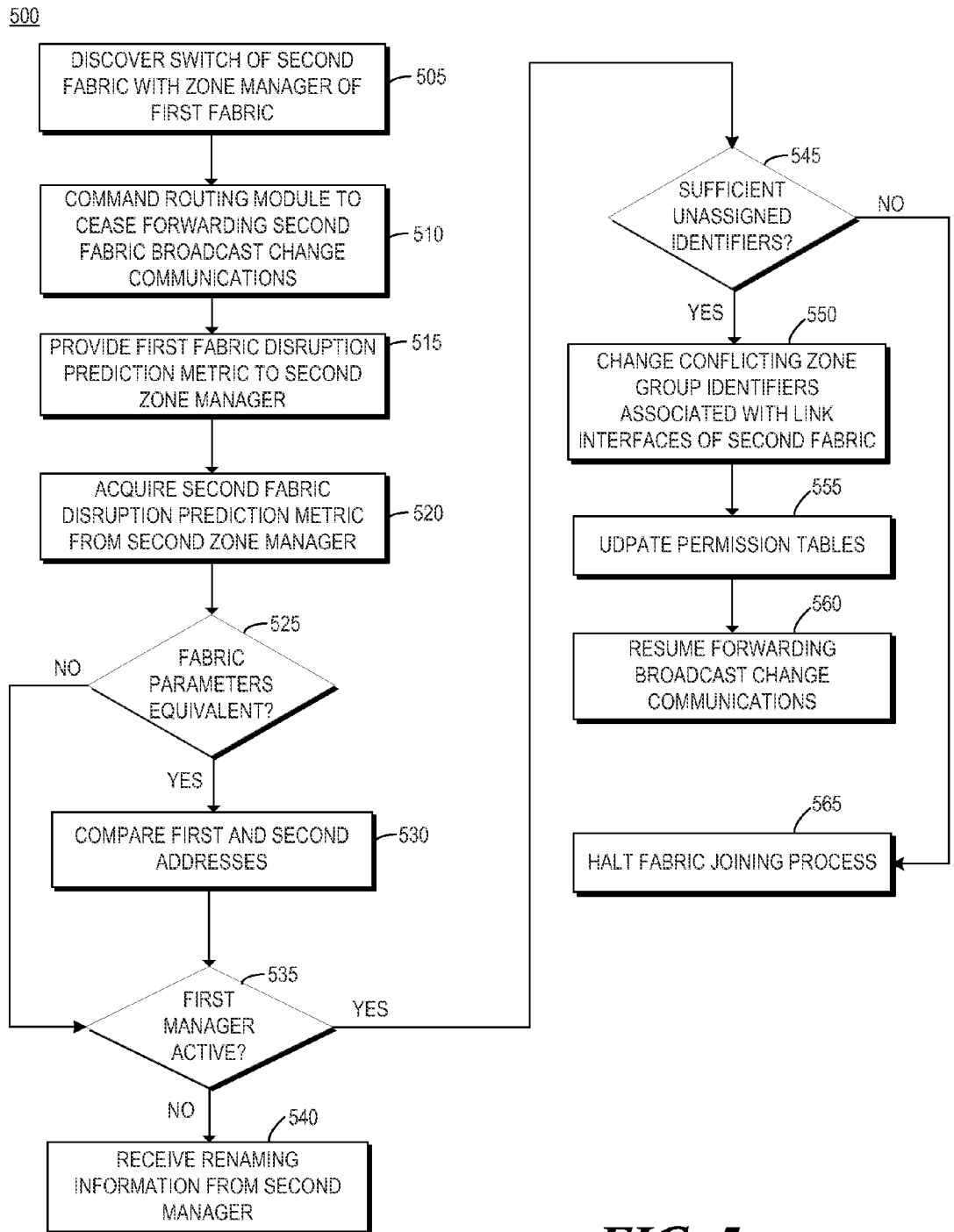
FIG. 5 is a flowchart of an example method for replacing conflicting zone group identifiers of one of two connected fabrics.

FIG. 5 is a flowchart of an example method 500 for replacing conflicting zone group identifiers of one of two connected fabrics. Although execution of method 500 is described below with reference to zone manager 250 of FIG. 2A, other suitable components for execution of method 500 can be utilized (e.g., computing device 100, zone manager 255, etc.). Additionally, method 500 may be implemented in the form of executable instructions encoded on a machine-readable storage medium, in the form of electronic circuitry, or a combination thereof.

At 505 of method 500, zone manager 250 of a fabric 211 may discover a switch of another fabric (e.g., fabric 213) after the switch is connected to fabric 211. In some examples, the switch may be routing module 257 of fabric 213, which zone manager 250 may discover after routing module 257 is connected to routing module 253 of fabric 211 via a cable 290, for example. At 510, in response to the discovery of the switch, zone manager 250 of fabric 211 may command routing module 253 of fabric 211 to cease forwarding broadcast change communications received from fabric 213. Also in response to the discovery of the switch, zone manager 250 may provide a disruption prediction metric 292 to a zone manager 255 of fabric 213 at 515, and may acquire a disruption prediction metric 294 from zone manager 255 at 520. In some examples, the disruption prediction metric may be, for example, a size of the fabric, an estimate of a load on the fabric, an amount of storage devices of the fabric having multiple fabric paths, or the like, as described above in relation to FIGS. 1-3.

At 525, zone manager 250 may compare disruption prediction metrics 292 and 294. If the metrics 292 and 294 are equivalent, method 500 may proceed to 530 and may proceed to 535 otherwise. For example, metrics 292 and 294 may be equivalent when they indicate that fabrics 211 and 213 have the same size. At 530, zone manager 250 may compare a fabric address (e.g., SAS address) of a routing module 253 associated with zone manager 250 with a fabric address (e.g., SAS address) of a routing module 258 associated with zone manager 255. In some examples described herein, routing module is associated with a zone manager if the routing module implements the zone manager, contains the zone manager, or is directly connected to the zone manager. After comparing the fabric addresses at 530, method 500 may proceed to 535.

At 535, zone manager 250 may determine whether it is the active zone manager. If metrics 292 and 294 were equivalent, zone manager 250 may determine whether it is the active zone manager based on the comparison of the fabric addresses. For example, zone manager 250 may determine that it is the active zone manager if the address of the routing module associated with zone manager 250 is greater than the address of the routing module associated with zone manager 255, and otherwise determine that it is not the active zone manager. If metrics 292 and 294 are not equivalent, zone manager 250 may determine whether it is the active zone manager based on the comparison of metrics 292 and 294, as described above in relation to FIGS. 1-3. If zone manager 250 determines that it is the active zone manager, method 500 may proceed to 545.

If zone manager 250 determines at 535 that it is not the active zone manager, then at 540 zone manager 250 may determine that it is a subordinate zone manager and receive identifier replacement information from zone manager 255, such as a mapping of replacement zone group identifiers to respective conflicting zone group identifiers. In such examples, the zone manager 205 may utilize the mapping to replace the identifiers assigned at link interfaces of fabric 211 and to update the permission tables in fabric 211.

At 545, zone manager 250 may determine whether sufficient unassigned zone group identifiers of fabric 211 exist to replace each conflicting zone group identifier of fabric 213. If not, method 500 may proceed to 565, where zone manager 250 may halt the process of joining fabrics 211 and 213, leaving them to function as if they were not connected. If zone manager 250 determines that sufficient unassigned zone group identifiers exist, method 500 may proceed to 550, where zone manager 250 may, for each link interface of fabric 213 assigned a conflicting zone group identifier, replace the conflicting zone group identifier assigned to the link interface with one of the unassigned zone group identifiers of fabric 211. At 555, zone manager 250 may, for each expander of fabric 213 including a permission table, update the permission table such that the access permission relationships between respective zone groups of fabric 213 are the same after replacing the conflicting zone group identifiers as before replacing them.

At 560, zone manager 250 may command routing module 253 to resume forwarding broadcast change communications received from fabric 213, after each conflicting zone group identifier in fabric 213 has been replaced. In some examples, functionalities described herein in relation to FIG. 5 may be provided in combination with functionalities described herein in relation to any of FIGS. 1-4.

What is claimed is:

1. A non-transitory machine-readable storage medium encoded with instructions executable by a processor of computing device, the storage medium comprising instructions to:
provide a first disruption prediction metric associated with a first fabric to a second fabric;
acquire, from the second fabric, a second disruption prediction metric associated with the second fabric;
compare the first and second disruption prediction metrics;
determine which of a first zone manager associated with the first fabric and a second zone manager associated with the second fabric is an active zone manager, based on a result of the comparison; and
designate a respective replacement zone group identifier for each zone group of the second fabric assigned a conflicting zone group identifier of the second fabric, in response to a determination that the first zone manager is the active zone manager.

2. The storage medium of claim 1, wherein:
the first disruption prediction metric represents a size of the first fabric and the second disruption prediction metric represents a size of the second fabric; and
the instructions to determine the active zone manager comprise instructions to determine that the first zone manager is the active zone manager if the size of the first fabric is greater than the size of the second fabric.

3. The storage medium of claim 2, wherein:
each replacement zone group identifier is a respective unassigned zone group identifier of the first fabric; and
the instructions to designate comprise instructions to replace each conflicting zone group identifier of the second fabric with the designated replacement zone group identifier, if there are a sufficient number of unassigned zone group identifiers in the first fabric to replace each conflicting zone group identifier of the second fabric.

4. The storage medium of claim 3, wherein the instructions to replace comprise instructions to:
for each link interface of the second fabric assigned a respective conflicting zone group identifier, replace the conflicting zone group identifier assigned to the link interface with the designated replacement zone group identifier; and
for each expander of the second fabric including a permission table, update the permission table stored on the expander such that the access permission relationships between respective zone groups of the second fabric are the same after the replacement of the conflicting zone group identifiers as before the replacement of the conflicting zone group identifiers.

5. The storage medium of claim 1, wherein:
the first disruption prediction metric represents an estimate of a load on the first fabric;
the second disruption prediction metric represents an estimate of a load on the second fabric; and
the instructions to determine comprise instructions to determine that the first zone manager is the active zone manager if the estimated load on the first fabric is greater than the estimated load on the second fabric.

6. The storage medium of claim 1, wherein:
the instructions to designate comprise instructions to provide, to the second zone manager, a mapping of the designated replacement zone group identifier to respective conflicting zone group identifiers; and
the instructions to compare comprise instructions to compare a plurality of disruption prediction metrics for the first fabric, including the first disruption prediction metric, to a plurality of disruption prediction metrics for the second fabric, including the second disruption prediction metric; and
the instructions to determine comprise instructions to determine which of the first and second zone managers is an active zone manager, based on a result of comparing the respective pluralities of disruption prediction metrics.

7. A system comprising:
a first zone manager of a first fabric comprising:
a provision module to provide, to a second zone manager of a second fabric, a first disruption prediction metric representing an amount of storage devices of the first fabric for which the first fabric has multiple fabric paths;
an acquisition module to acquire, from the second zone manager, a second disruption prediction metric representing an amount of storage devices of the second fabric for which the second fabric has multiple fabric paths;
a decision module to determine that the first zone manager is an active zone manager if the first and second disruption prediction metrics indicate that the amount of storage devices having multiple fabric paths is greater in the second fabric than in the first fabric; and
a resolution module to replace each conflicting zone group identifier of the second fabric with a respective unassigned zone group identifier of the first fabric in response to a determination that the first zone manager is the active zone manager, if there are sufficient unassigned zone group identifiers of the first fabric.

8. The system of claim 7, wherein, to replace conflicting zone group identifiers of the second fabric, the resolution module is to, for each storage device of the second fabric for which the second fabric has multiple fabric paths, replace respective conflicting zone group identifiers assigned to link interfaces in one of the fabric paths before replacing any conflicting zone group identifier associated with any link interface in another of the fabric paths.

9. The system of claim 7, wherein:
the decision module is further to determine whether the first zone manager is an active zone manager based on a comparison of other respective disruption prediction metrics of the first and second fabrics if the first and second disruption prediction metrics are equivalent; and
the decision module is further to determine that the first zone manager is a subordinate zone manager if the first and second disruption prediction metrics indicate that the amount of storage devices having multiple fabric paths is greater in the first fabric than in the second fabric.

10. The system of claim 9, wherein the resolution module comprises:
- a receipt module to receive a mapping of replacement zone group identifiers to conflicting zone group identifiers of the first fabric; and
- a replacement module to replace the conflicting zone group identifiers with respective replacement zone group identifiers designated in the mapping at each expander implementing zoning in the first fabric, if the first zone manager is the subordinate zone manager.

11. The system of claim 8, wherein the resolution module further comprises:
- an identifier module to determine whether there are a sufficient number of unassigned zone group identifiers in the first fabric to replace each conflicting zone group identifier of the second fabric with a respective one of the unassigned zone group identifiers, if the first zone manager is the active zone manager; and
- a halt module to halt a process of joining the first and second fabrics, if the first zone manager is the active zone manager and there are not a sufficient number of unassigned zone group identifiers.

12. A method comprising:
- commanding a routing module of a first fabric to cease forwarding broadcast change communications received from a second fabric, in response to discovery of a switch of the second fabric by a first zone manager of the first fabric;
- providing a first disruption prediction metric representing a size of the first fabric to a second zone manager of a second fabric, in response to the discovery of the switch;
- acquiring a second disruption prediction metric representing a size of the second fabric from the second zone manager, in response to the discovery of the switch;
- determining that the first zone manager is an active zone manager if the first and second disruption prediction metrics indicate that the size of the first fabric is greater than the size of the second fabric; and
- replacing, with the first zone manager, each conflicting zone group identifier of the second fabric with a respective unassigned zone group identifier of the first fabric in response to a determination that the first zone manager is the active zone manager, if there are sufficient unassigned zone group identifiers of the first fabric.

13. The method of claim 12, wherein the determining comprises:
- determining whether the first zone manager is the active zone manager based on a comparison of a fabric address of the routing module with a fabric address of another routing module associated with the second zone manager, if the respective sizes of the first and second fabrics are the same.

14. The method of claim 12, wherein the replacing comprises:
- for each link interface of the second fabric assigned a respective conflicting zone group identifier, replacing the conflicting zone group identifier assigned to the link interface with one of the unassigned zone group identifiers of the first fabric; and
- for each expander of the second fabric including a permission table, update the permission table such that the access permission relationships between respective zone groups of the second fabric are the same after replacing the conflicting zone group identifiers as before replacing the conflicting zone group identifiers.

15. The method of claim 12, further comprising:
- discovering the switch of the second fabric with a first zone manager of the first fabric after the switch is connected to the first fabric; and
- commanding the routing module to resume forwarding broadcast change communications received from the second fabric after replacing each conflicting zone group identifier in the second fabric.

* * * * *